F. H. JOHN.
AUTO WHEEL.
APPLICATION FILED FEB. 8, 1913.
1,102,665.
Patented July 7, 1914.
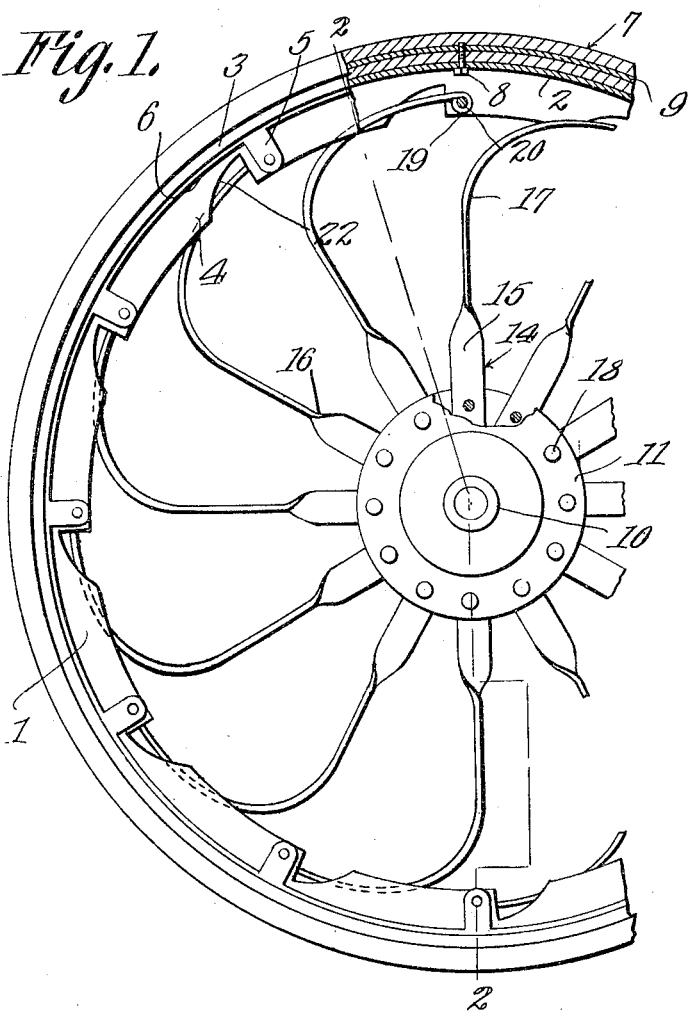
Fig. 1.
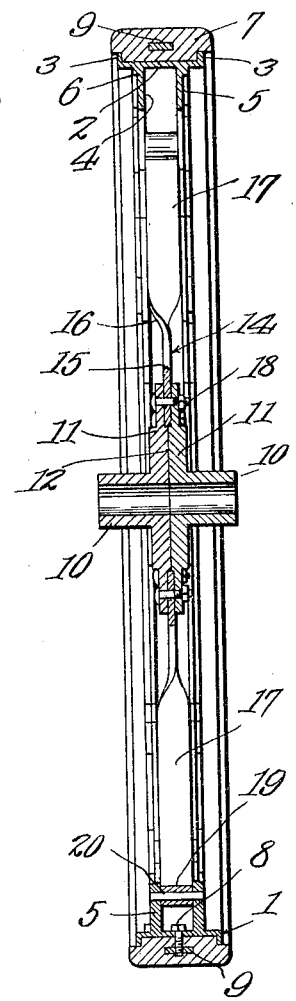
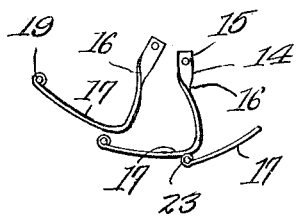
Fig. 3.
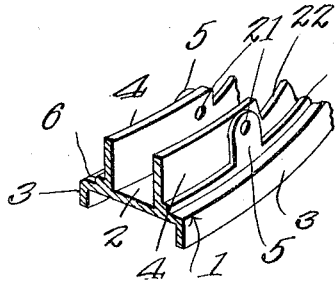
Fig. 2.
Fig. 4.
Frederick H. John, Inventor,
by C. A. Snow & Co.
Attorneys.
Witnesses
THE NORRIS PETERS CO., PHOTO-LITHO., WASHINGTON, D. C.

_UNITED STATES PATENT OFFICE._

FREDERICK H. JOHN, OF MIDDLEPORT, PENNSYLVANIA.

AUTO-WHEEL.

1,102,665. Specification of Letters Patent. Patented July 7, 1914.

Application filed February 8, 1913. Serial No. 747,192.

_To all whom it may concern:_

Be it known that I, FREDERICK H. JOHN, a citizen of the United States, residing at Middleport, in the county of Schuylkill and State of Pennsylvania, have invented a new and useful Auto-Wheel, of which the following is a specification.

The device forming the subject matter of this application is a resilient wheel, and one object of the present invention is to provide a spring spoke of novel and improved form and to provide novel means for assembling the spoke with the hub.

Another object of the invention is to provide novel means for assembling the spoke with the rim, whereby the connection between one spoke and the rim will constitute an abutment for an adjoining spoke, when the adjoining spoke is under compression, thereby relieving the strain upon the adjoining spoke.

Another object of the present invention is to provide a rim of novel form, adapted to receive the strain imposed thereon when one spoke abuts against the connection of another spoke in the manner hereinbefore set forth.

It is within the scope of the invention to improve generally and to enhance the utility of, devices of that type to which the present invention appertains.

With the above and other objects in view which will appear as the description proceeds, the invention resides in the combination and arrangement of parts and the details of construction hereinafter described and claimed, it being understood that changes in the precise embodiment of invention herein disclosed can be made within the scope of what is claimed without departing from the spirit of the invention.

In the drawings: Figure 1 shows the invention in side elevation, parts being broken away; Fig. 2 is a transverse section on the line 2—2 of Fig. 1; Fig. 3 is a diagrammatic elevation showing the manner in which the spokes coöperate with each other under compression; and Fig. 4 is a fragmental perspective of the rim.

In carrying out the invention there is provided a rim which is denoted by the numeral 1. The rim 1 is preferably made of metal and is a one-piece structure, the same comprising a band or body 2 provided along its edges with outstanding flanges 3. The flanges 3 may be omitted if so desired. The rim 1 is equipped with inwardly projecting flanges 4. Formed integrally with the flanges 4 are radial ribs 5, connected by beads 6 which extend between the ribs 5 and lie in the angle defined by the flanges 4 and by the body or band 2 of the rim 1. The flanges 4 support the spokes laterally and prevent the wheel from dishing when upon a curve.

The tire 7 is seated on the band or body 2 and lies between the outstanding flanges 3, the tire being of any desired form. The tire 7 is secured to the band 2 by means of screw bolts 8 or other connecting elements adapted to a like end. If desired, a plate 9 may be inserted in the tire 7 to afford a firm hold for the ends of the screw bolts 8.

The hub is a two-part structure, each part of the hub comprising a tubular element 10, formed integrally with the inner end of which is an extension plate 11 which preferably is of circular contour. The extension plates 11 are provided with radial grooves in their inner faces defining openings which receive the inner ends of the spokes 14, the spokes abutting against the shoulders 12 which define the inner ends of the openings.

The spoke 14 is preferably fashioned from a resilient metal and is of falciform contour, the shank 15 of the spoke lying parallel to the median plane of the wheel, and being engaged beween the extension plates 11 of the hub parts as hereinbefore described. Adjacent the hub the spokes are given a quarter twist as indicated at 16, so that the curved body 17 lies at right angles to the median plane of the wheel. Bolts 18 pass through the shanks 15 of the spokes and through the extension plates 11 of the hub, to hold these parts assembled. There may be more than one bolt 18 to each spoke. The outer ends of the spokes 14 terminate in eyes 19 through which pass bolts 20 or other securing elements adapted to a like end, the bolts 20 being engaged in the openings 21 formed in the ribs 5.

When the wheel hereinbefore described is under due stress, as when the vehicle jolts forcibly over some obstruction, one or more of the spokes 14 which are located at the lower portion of the wheel will abut as indicated at 23 against the eyes 19 of an adjoining spoke as clearly shown in Fig. 3. Thus, the strain imposed on the spoke which is under stress, will be lessened. Owing to the fact that the rim is provided with ribs 5, the flanges 4 of the rim are strengthened and are well adapted to receive the additional strain imposed when the spokes co-act as hereinbefore described, and denoted specifically in Fig. 3 by the reference character 23.

The outer end of the spoke 14 lies tangential to the body portion 2 of the rim 4. As a consequence, a pointed, triangular space exists between the tangentially disposed outer end of the spoke and the body of the rim 1. In order to prevent snow, dirt, and other foreign material from lodging in this restricted space, the flanges 4 are notched as indicated at 22, the notches 22 extended outwardly, toward the periphery of the rim and past the tangential ends of the spokes, the notches 22 serving to prevent an accumulation of material at the point indicated. The notches 22 may be of any form.

Having thus described the invention what is claimed is:—

1. A wheel comprising a hub; a rim; spokes each comprising a straight portion disposed radially of the hub and secured to the hub, and a curved portion disposed circumferentially of the rim; and connections uniting the curved portions of the spoke with the rim, each connection constituting an abutment for the curved portion of an adjoining spoke when the adjoining spoke is under compression, and the straight portion of each spoke being alined radially with the connection between the curved portion of an adjoining spoke and the rim.

2. A wheel comprising a rim including a body and flanges; a hub; curved spring spokes secured to the hub; connections uniting the spokes to the flanges, each connection constituting an abutment adapted to receive an adjacent spoke when the adjacent spoke is under compression, the flanges being provided upon their side faces with radial reinforcing ribs receiving the connections.

In testimoy that I claim the foregoing as my own, I have hereto affixed my signature in the presence of two witnesses.

FREDERICK H. JOHN.

Witnesses:
CHAS. A. SHIELDS,
JOHN MCCABE.

---

Copies of this patent may be obtained for five cents each, by addressing the "Commissioner of Patents, Washington, D. C."